(12) United States Patent
Kleine et al.

(10) Patent No.: US 12,529,720 B2
(45) Date of Patent: Jan. 20, 2026

(54) FAULT DETECTION METHOD AND SYSTEM FOR A SUBSEA ELECTRICAL LINE

(71) Applicant: ONESUBSEA IP UK LIMITED, London (GB)

(72) Inventors: Ulrich Kleine, Celle (DE); Kenny Bohle, Celle (DE); Burkhard Sommer, Houston, TX (US); Wolfgang Holkenbrink, Celle (DE); Thomas Marwedel, Celle (DE); Ralf Wierse, Celle (DE)

(73) Assignee: ONESUBSEA IP UK LIMITED, London (GB)

( * ) Notice: Subject to any disclaimer, the term of this patent is extended or adjusted under 35 U.S.C. 154(b) by 169 days.

(21) Appl. No.: 18/006,188

(22) PCT Filed: Jul. 20, 2021

(86) PCT No.: PCT/US2021/042336
§ 371 (c)(1),
(2) Date: Jan. 20, 2023

(87) PCT Pub. No.: WO2022/020328
PCT Pub. Date: Jan. 27, 2022

(65) Prior Publication Data
US 2023/0258704 A1 Aug. 17, 2023

Related U.S. Application Data

(60) Provisional application No. 63/053,943, filed on Jul. 20, 2020.

(51) Int. Cl.
*G01R 31/08* (2020.01)
*E21B 41/00* (2006.01)
*E21B 43/16* (2006.01)

(52) U.S. Cl.
CPC .......... *G01R 31/08* (2013.01); *E21B 41/0007* (2013.01); *E21B 43/16* (2013.01); *E21B 2200/22* (2020.05)

(58) Field of Classification Search
CPC ..... G01R 31/08; E21B 43/16; E21B 41/0007; E21B 2200/22; E21B 41/005;
(Continued)

(56) References Cited

U.S. PATENT DOCUMENTS

2005/0232145 A1* 10/2005 Tanju .................... H04L 47/125
370/217
2014/0062715 A1* 3/2014 Clark .................... E21B 17/028
340/853.2

(Continued)

FOREIGN PATENT DOCUMENTS

WO 2017003476 A1 1/2017

OTHER PUBLICATIONS

Search Report and Written Opinion of International Patent Application No. PCT/US2021/042336 issued on Nov. 2, 2021; 12 pages.
(Continued)

*Primary Examiner* — Eman A Alkafawi
*Assistant Examiner* — Suresh K Rajaputra
(74) *Attorney, Agent, or Firm* — Jeffrey D. Frantz

(57) ABSTRACT

Techniques for identifying and locating a fault within a subsea hydrocarbon extraction system include receiving, via a main channel line and from a first subsea modem, first data associated with a first subsea control module, wherein the main channel line is communicatively coupled to the first subsea modem via a first channel leg line, receiving, via the main channel line and from a second subsea modem, second data associated with a second subsea control module, wherein the main channel line is communicatively coupled to the second subsea modem via a second channel leg line,
(Continued)

identifying a fault or a developing fault in the first channel leg line based on an analysis of the first data and the second data, and generating and transmitting a notification indicating the fault or the developing fault in the first channel leg line.

14 Claims, 5 Drawing Sheets

(58) Field of Classification Search
CPC .......... E21B 41/00; E21B 41/04; E21B 41/06; E21B 41/08; E21B 41/10; E21B 47/12; E21B 33/035; E21B 33/043; E21B 33/064; E21B 33/076; E21B 34/06; E21B 34/16
See application file for complete search history.

(56) References Cited

U.S. PATENT DOCUMENTS

| | | |
|---|---|---|
| 2014/0152456 A1* | 6/2014 | Olson .................... E21B 47/12 340/853.2 |
| 2014/0333452 A1 | 11/2014 | Nakayama |
| 2017/0002640 A1 | 1/2017 | Hoefel |
| 2017/0122094 A1 | 5/2017 | Chugunov |
| 2018/0143616 A1* | 5/2018 | Robello ................. E21B 44/00 |
| 2019/0249543 A1* | 8/2019 | Chu .................. H04L 12/40136 |
| 2020/0125225 A1* | 4/2020 | Bettles ............ G06Q 10/06393 |
| 2021/0384988 A1* | 12/2021 | Evans .................... H04B 10/80 |

OTHER PUBLICATIONS

International Preliminary Report on Patentability of Patent Application No. PCT/US2021/042336 issued on Feb. 2, 2023; 8 pages.

* cited by examiner

FAULT DETECTION METHOD AND SYSTEM FOR A SUBSEA ELECTRICAL LINE

CROSS-REFERENCE TO RELATED APPLICATION

This application is a national stage entry under 35 U.S.C. § 371 of International Application No. PCT/US2021/042336, entitled "FAULT DETECTION METHOD AND SYSTEM FOR A SUBSEA ELECTRICAL LINE," filed on Jul. 20, 2021, which claims benefit of U.S. Provisional Patent Application No. 63/053,943, entitled "FAULT DETECTION METHOD AND SYSTEM FOR A SUBSEA ELECTRICAL LINE," filed on Jul. 20, 2020, and which is herein incorporated by reference in its entirety for all purposes.

BACKGROUND

The present disclosure relates generally to subsea hydrocarbon extraction systems, and more specifically to identifying and locating faults within subsea hydrocarbon extraction systems.

This section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

For subsea applications, hydrocarbon fluids such as oil and natural gas are obtained from a subterranean geologic formation, referred to as a reservoir, by drilling a well through a subsea wellhead system that penetrates the hydrocarbon-bearing geologic formation. In subsea applications, various types of infrastructure may be positioned along a sea floor and coupled by electrical lines.

In the subsea hydrocarbon production industry, electrical lines are thus very long (up to and exceeding hundreds of kilometers) and may include components with life cycles up to and exceeding 30 years or more. Accordingly, locating and repairing faults in electrical lines at depths up to and sometimes exceeding 3000 meters can be time and resource intensive. For example, to locate and repair a fault in an electrical line, a vessel may be mobilized at a cost of hundreds of thousands of dollars a day to disconnect and re-mate electrical connections between subsea trees and distribution units. Locating and repairing electrical line faults in this was may take weeks or months. Further, the inspection process of disconnecting and re-mating electrical connections between subsea trees and distribution units may introduce additional risks to the functionality of the system, potentially creating new faults.

There is therefore a need to improve monitoring of subsea electrical lines.

SUMMARY

This summary is provided to introduce a selection of concepts that are further described below in the detailed description. This summary is not intended to identify key or essential features of the claimed subject matter, nor is it intended to be used as an aid in determining or limiting the scope of the claimed subject matter as set forth in the claims.

In embodiments of the disclosure, a subsea hydrocarbon extraction system includes a first subsea control module configured to control operation of a first subsea asset, a first subsea modem, communicatively coupled to the first subsea control module and configured to transmit first data via a first channel leg line, a second subsea control module configured to control operation of a second subsea asset, a second subsea modem, communicatively coupled to the second subsea control module and configured to transmit second data via a second channel leg line, and a master control station. The master control station is configured to receive the first data and the second data via a main channel line communicatively coupled to the first channel leg line and the second channel leg line, identify a fault or a developing fault in the first channel leg line based on an analysis of the first data and the second data, and generate and transmit a notification indicating the fault or the developing fault in the first channel leg line.

In embodiments of the disclosure, a subsea hydrocarbon extraction system includes a master control station having a processor and a memory. The memory stores instructions that, when executed by the processor, cause the processor to receive, via a main channel line and from a first subsea modem, first data associated with a first subsea control module, wherein the main channel line is communicatively coupled to the first subsea modem via a first channel leg line, receive, via the main channel line and from a second subsea modem, second data associated with a second subsea control module, wherein the main channel line is communicatively coupled to the second subsea modem via a second channel leg line, identify a fault or a developing fault in the first channel leg line based on an analysis of the first data and the second data, and generate and transmit a notification indicating the fault or the developing fault in the first channel leg line In embodiments of the disclosure, a method for identifying and locating a fault within a subsea hydrocarbon extraction system includes receiving, via a main channel line and from a first subsea modem, first data associated with a first subsea control module, wherein the main channel line is communicatively coupled to the first subsea modem via a first channel leg line, receiving, via the main channel line and from a second subsea modem, second data associated with a second subsea control module, wherein the main channel line is communicatively coupled to the second subsea modem via a second channel leg line, identifying a fault or a developing fault in the first channel leg line based on an analysis of the first data and the second data, and generating and transmitting a notification indicating the fault or the developing fault in the first channel leg line.

BRIEF DESCRIPTION OF THE DRAWINGS

For a detailed description of exemplary embodiments, reference will now be made to the accompanying drawings in which.

DETAILED DESCRIPTION

Figure 1:
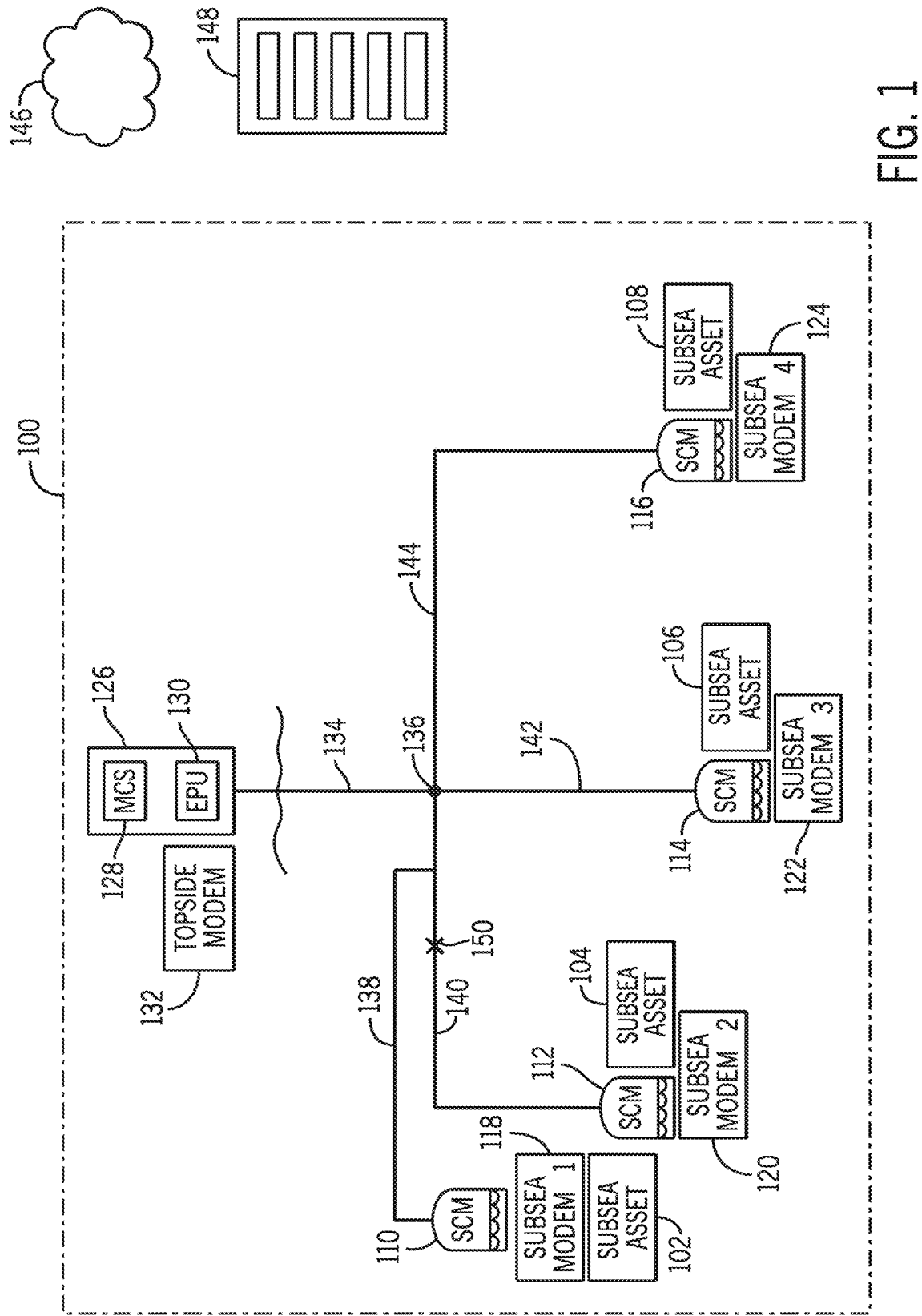
FIG. 1 is schematic of a subsea hydrocarbon extraction system, in accordance with an embodiment of the present disclosure.

In the drawings and description that follow, like parts are typically marked throughout the specification and drawings with the same reference numerals. The drawing figures are not necessarily to scale. Certain features of the disclosed embodiments may be shown exaggerated in scale or in somewhat schematic form and some details of conventional elements may not be shown in the interest of clarity and conciseness. The present disclosure is susceptible to embodiments of different forms. Specific embodiments are described in detail and are shown in the drawings, with the understanding that the present disclosure is to be considered an exemplification of the principles of the disclosure and is not intended to limit the disclosure to that illustrated and described herein. It is to be fully recognized that the different teachings of the embodiments discussed below may be employed separately or in any suitable combination to produce desired results.

Unless otherwise specified, in the following discussion and in the claims, the terms "including" and "comprising" are used in an open-ended fashion, and thus should be interpreted to mean "including, but not limited to . . . ." Any use of any form of the terms "connect," "engage," "couple," "attach," or any other term describing an interaction between elements is not meant to limit the interaction to direct interaction between the elements and may also include indirect interaction between the elements described. The various characteristics mentioned above, as well as other features and characteristics described in more detail below, will be readily apparent to those skilled in the art upon reading the following detailed description of the embodiments, and by referring to the accompanying drawings.

With the foregoing in mind, FIG. 1 is schematic of a subsea hydrocarbon extraction system 100. As shown, the subsea hydrocarbon extraction system 100 includes one or more subsea assets 102, 104, 106, 108, which may represent wells, wellheads, pumps, valves, or other equipment used in the subsea extraction of hydrocarbons. Though the subsea assets 102, 104, 106, 108 shown in FIG. 1 are placed nearby one another, it should be understood that FIG. 1 is not to scale and that the subsea assets 102, 104, 106, 108 may be disposed at various locations a great distance from one another (e.g., hundreds of meters, kilometers, tens of kilometers, or even hundreds of kilometers). As shown in FIG. 1, each location having a subsea asset 102, 104, 106, 108 may also include a subsea control module (SCM) 110, 112, 114, 116 and/or a subsea modem 118, 120, 122, 124. The subsea assets 102, 104, 106, 108 may be controlled by a topside control unit 126, which may be disposed at or near the surface and include a Master Control Station (MCS) 128 and an Electrical Power Unit (EPU) 130. As shown, the topside control unit 126 may also include a topside modem 132. The topside control unit 126 may be communicatively coupled to the subsea components via a main channel line 134 that extends to a subsea node 136. Though a single node 136 is shown in FIG. 1, it should be understood that embodiments having multiple nodes, or multiple levels of nodes, are also envisaged. A shown, each of the SCMs 110, 112, 114, 116 is communicatively coupled to the node 136 via a channel leg line 138, 140, 142, 144. Accordingly, the topside control unit 126 receives data for the various subsea assets 102, 104, 106, 108 from the SCMs 110, 112, 114, 116 via the subsea modems 118, 120, 122, 124, transmitted through the channel leg lines 138, 140, 142, 144 and the main channel line 134. In some embodiments, the collected data may be stored in memory in the topside control unit 126. However, in other embodiments, data may also be stored in the cloud 146, on a remotely located server 148 (e.g., in a data center), or some combination thereof.

The MCS 128 may analyze the received data and generate control signals for the various SCMs 110, 112, 114, 116. Accordingly, the topside control unit 126 may transmit control signals generated by the MCS 128 and/or power signals generated by the EPU 130 to the SCMs 110, 112, 114, 116 via the topside modem 132, transmitted through the main channel line 134 and the channel leg lines 138, 140, 142, 144. The SCMs 110, 112, 114, 116 may then control the subsea assets 102, 104, 106, 108 based on the received signals. In some embodiments the SCMs 110, 112, 114, 116 and/or the subsea modems 118, 120, 122, 124 may include sensors for collecting data associated with the subsea assets 102, 104, 106, 108, the SCMs 110, 112, 114, 116, the subsea modems 118, 120, 122, 124, the various communication lines 134, 136, 138, 140, 142, 144, or other components within the subsea hydrocarbon extraction system 100. Accordingly the collected data may be transmitted back to the MCS 128. Communication between the various components may be facilitated by the modems 118, 120, 122, 124, 132 distributed throughout the subsea hydrocarbon extraction system 100.

As previously discussed, during the life of the subsea hydrocarbon extraction system 100, which may extend for decades, faults 150 may develop in the main channel line 134 and the channel leg lines 138, 140, 142, 144. These faults 150 may be caused by insulation degradation, connector deterioration, connectors becoming disconnected, lines being severed or sheared, and so forth. In general a fault is when a line's insulation is compromised or the line is otherwise unable to transmit a signal or impaired in its ability to transmit a signal. In some cases, faults 150 may develop over long periods of time, whereas in other cases, faults 150 may develop in a short period of time (e.g., seconds or minutes). Locating and repairing faults on lines disposed at up to an exceeding 3,000 meters in depth may be extraordinarily resource intensive. For example, a vessel may be mobilized at a cost of hundreds of thousands of dollars a day to disconnect and re-connect electrical connections (e.g., via remotely operated vehicle or robot) between the various lines 134, 138, 140, 142, 144 to locate the fault, which may take weeks or months. Further, the process of disconnecting and re-connecting electrical connections between lines 134, 138, 140, 142, 144 may create new faults. Accordingly, the presently disclosed techniques include analyzing data collected from the SCMs 110, 112, 114, 116 before the fault and after the fault to determine whether the fault is disposed on the main channel line 134 or a particular channel leg line 138, 140, 142, 144.

Though modems 118, 120, 122, 124, 132 have been used in subsea hydrocarbon extraction systems 100 to facilitate the transmission of control and/or power signals between the various components of a subsea hydrocarbon extraction system 100, using modems 118, 120, 122, 124, 132 to collect and/or transmit data used to identify, locate, and predict communication line faults within a subsea hydrocarbon extraction system 100 takes advantage of existing hardware within a subsea hydrocarbon extraction system 100 to identify, locate, and predict communication line faults without the added cost and complexity of adding new hardware components.

For example, in the embodiment shown in FIG. 1, a fault 150 is disposed on the channel leg line 140 that leads to subsea asset 104, SCM 112, and subsea modem 120. By comparing data received by the topside control unit 126 from all of the SCMs 110, 112, 114, 116 within the subsea hydrocarbon extraction system 100 before the fault 150 occurs (e.g., data collected at a time when the collected data was known to be within a specified acceptance criteria or within expected operational ranges) to data received by the topside control unit 126 from all of the SCMs 110, 112, 114, 116 within the subsea hydrocarbon extraction system 100 after the fault 150 occurs, the topside control unit 126 would be able to determine that data received from SCM 112 was affected by the fault 150, but data received from the other SCMs 110, 112, 114, 116 was not affected by the fault 150. Accordingly, the topside control unit 126 can locate the fault as likely occurring somewhere on channel leg line 140 between the node 136 and SCM 112.

By this process, the topside control unit 126 would be able to locate a fault occurring on the main channel line 134 by comparing data received by the topside control unit 126 from all of the SCMs 110, 112, 114, 116 within the subsea hydrocarbon extraction system 100 before the fault 150 occurs to data received by the topside control unit 126 from all of the SCMs 110, 112, 114, 116 within the subsea hydrocarbon extraction system 100 after the fault 150 occurs, and determining that data received from all of the SCMs 110, 112, 114, 116 was affected by the fault 150. Similarly, in embodiments, having multiple nodes 136, multiple levels of nodes 136, or a more complex structure of leg lines 138, 140, 142, 144 (e.g., multiple levels of leg lines), the topside control unit 126 would be able to locate a fault by comparing data received by the topside control unit 126 from all of the SCMs 110, 112, 114, 116 within the subsea hydrocarbon extraction system 100 before the fault 150 occurs to data received by the topside control unit 126 from all of the SCMs 110, 112, 114, 116 within the subsea hydrocarbon extraction system 100 after the fault 150 occurs, and identifying a subset group of SCMs that were affected by the fault 150.

To perform these techniques, the topside control unit 126 considers data that is already being collected by SCMs 110, 112, 114, 116 within subsea hydrocarbon extraction systems 100 without adding new hardware to the subsea hydrocarbon extraction system 100 or collecting additional data that is not already being collected to other purposes. Accordingly, implementing the disclosed techniques does not add new hardware to a subsea hydrocarbon extraction system 100 or involve collection of new data. For example, in analyzing data, the topside control unit 126 may consider communication signals and/or communication diagnostic data received or derived from telemetry modems 118, 120, 122, 124 and/or the SCMs 110, 112, 114, 116 within the system 100. In some embodiments, data associated with line resistance/conductance, and/or impedance may be collected via the EPU 130. For example, the topside control unit 126 may analyze line insulation impedance, insulation resistance, signal amplitude, signal power, signal attenuation, signal frequency spectra, signal to noise ratio, signal modulation, error rates and so forth. Measurements may be taken electronically, physically, derived by analyzing received data, and so forth. In some embodiments, measurements may be recorded in a wire-to-ground or in a wire-to-wire configuration. Further, in some embodiments, a machine learning algorithm or model (e.g., via a trained neural network) may be trained using a training data set of historical data of past faults, locations of the past faults, and data received before and after the past faults occurred to identify interdependencies and correlations between values.

As described in more detail below, collected data may include signs of a developing fault. Accordingly, rather than a step function that occurs at some moment in time in which a monitored value drops from a normal or expected operating value to zero, in some embodiments, the monitored value may slowly degrade over a period of time before the fault causes a signal to cease. While in some cases, system response of the monitored value may be linear, while in other cases the system response of the monitored value may be non-linear. In cases in which the system response is non-linear, using linear mathematical models to model system response to locate and/or predict faults may make it difficult to accurately identify trends and set threshold values. Accordingly, historical data of past faults, locations of the past faults, and data received before and after the past faults occurred may be used as training data for a machine learning model that identifies trends in collected data. Based on the historical data, the machine learning model may be able to identify patterns of healthy communication within the subsea hydrocarbon extraction system 100 and build a mathematical system model of the physical system and identify sources of disturbance. Once trained, the machine learning model may be configured to set threshold values and/or operational ranges of values for monitored data, and/or provide trends that may be used to identify and locate a developing fault. Accordingly, the machine learning model may be configured to identify patterns that indicate possible deviations from the expected behavior, thus indicating possible line performance degradation and a developing fault. Upcoming or existing faults may be identified in terms of the position and time of the fault occurrence. As time passes, collected data may be added to the historical data set, increasing the size of the data used to train the machine learning model. Accordingly, the machine learning model may be retrained based on new data on an iterative or rolling basis. In some embodiments, machine learning techniques may be used to generate a model of the system, which is then applied to collected data to predict and/or locate faults within the subsea hydrocarbon extraction system 100. However, in other embodiments, machine learning techniques may continue to be used to analyze collected data to predict and/or locate faults within the subsea hydrocarbon extraction system 100.

The machine learning model may also be configured to recognize drift within a subsea hydrocarbon extraction system 100 and update trends, set threshold values, and/or operational ranges of values for monitored data accordingly. This may performed during normal or scheduled model retraining, or automatically as the model monitors collected data.

Though the instant techniques are described as being applied to a subsea hydrocarbon extraction system 100, it should be understood that other embodiments are envisaged in which the disclosed techniques are applied to other complex communication systems. For example, the disclosed techniques may be applied to other complex communication networks such as telecommunication networks having difficult to access underground communication lines and/or above-ground communication lines, subsea telecommunication lines, communication networks in manufacturing facilities, information technology (IT) networks, or other wired or wireless communication networks.

Figure 2:
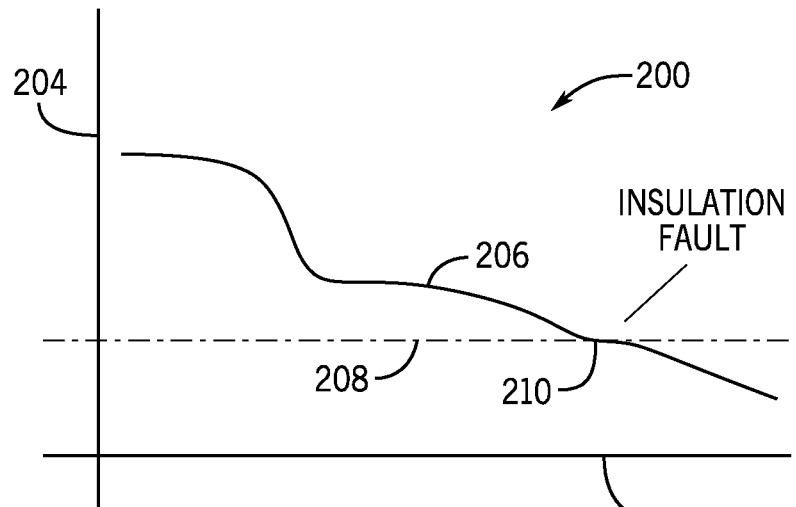
FIG. 2 is a plot of measured insulation resistance over time for a channel leg line of the subsea hydrocarbon extraction system shown in FIG. 1, in accordance with an embodiment of the present disclosure.

FIG. 2 is a graph 200 of a measured insulation resistance value over time for a channel leg line experiencing a fault (such as channel leg line 140 shown in FIG. 1). In the graph 200 shown in FIG. 2, the horizontal axis 202 represents time, while the vertical axis 204 represents amplitude of measured insulation resistance for the channel leg line. The plot 206 represents the change in measured insulation resistance for the channel leg line over time. The horizontal dashed line 208 represents the threshold value for measured insulation resistance for the channel leg line, below which the measured insulation resistance value indicates that a fault 210 has developed or is developing. As shown in FIG. 2, measured insulation resistance for the channel leg line decreases in a non-linear fashion over time, approaching the set threshold value 208. Once the measured insulation resistance for the channel leg line reaches and/or crosses the threshold value 208, the system may identify that the fault 210 has developed or is developing on the respective channel leg line. Accordingly, the system may generate a notification indicating that the fault 210 has developed or is developing and identifying the channel leg line experiencing the fault.

Further, as previously described, the system analyze the behavior of the measured insulation resistance 206 as it approaches the set threshold value 208 to identify any trends in the measured insulation resistance 206 as the fault develops. Accordingly, the system may determine whether the set threshold value 208 and/or or any other identifiable trends provided by the machine learning model are correct or should be updated.

Though the graph 200 shown in FIG. 2 includes a plot 206 of measured insulation resistance at a single SCM or subsea modem over time, it should be understood that the graph 200 is merely an example and that other graphs 200 are also envisaged. For example, the system may graph measurements for line insulation impedance, insulation resistance, signal amplitude, signal power, signal attenuation, signal frequency spectra, signal to noise ratio, signal modulation, error rates and so forth. Further, graphs 200 may be generated that include data measured or collected from multiple different locations (e.g., multiple SCMs or subsea modems). Moreover, graphs 200 may be generated with different axes and/or with different axis scales (e.g., linear, logarithmic, etc.).

Figure 3:
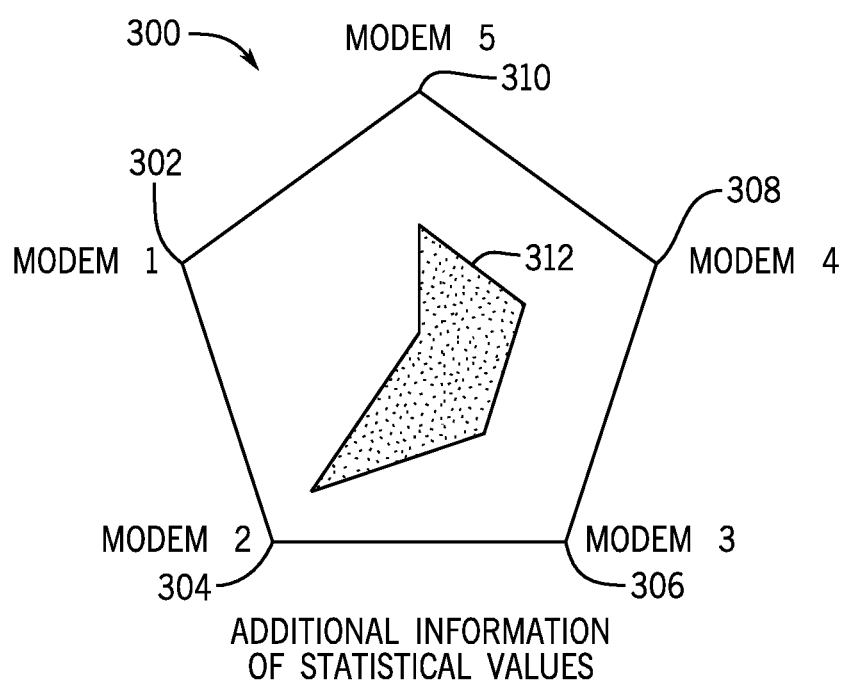
FIG. 3 is a fault notification graphic generated in response to a fault being detected within the subsea hydrocarbon extraction system shown in FIG. 1, in accordance with an embodiment of the present disclosure.
Figure 4:
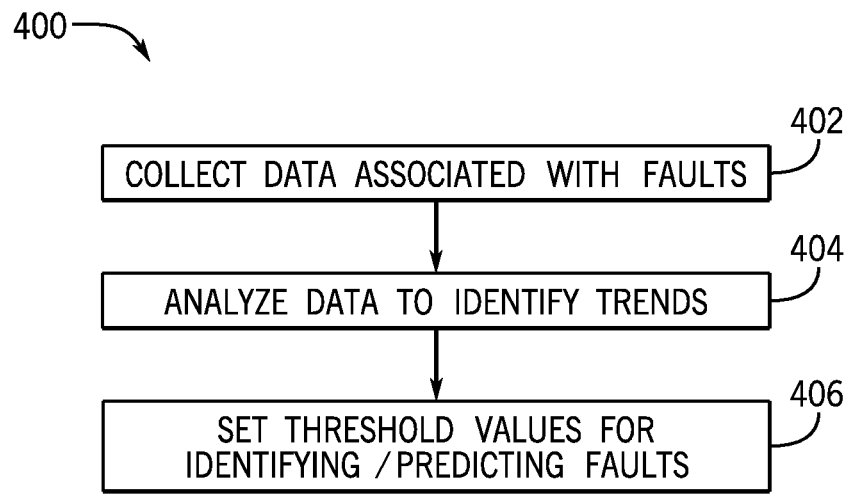
FIG. 4 is a flow chart of a process for training a model to identify and locate faults or developing faults within the subsea hydrocarbon extraction system shown in FIG. 1, in accordance with an embodiment of the present disclosure.

FIG. 3 is an example of a fault notification graphic 300 generated by the system in response to a fault being detected. As previously described, when a developing or developed fault is identified or predicted, a notification may be generated. As previously described, data from all of the modems 302, 304, 306, 308, 310 in a subsea hydrocarbon extraction system, or a subset of modems 302, 304, 306, 308, 310 within a subsea hydrocarbon extraction system may be analyzed to compare data collected at one or more moments in time before the fault had developed (e.g., when monitored values were within expected operational ranges and/or before monitored values crossed one or more set thresholds) to data collected at one or more moments in time after the fault had developed (e.g., when monitored values were outside of expected operational ranges and/or after monitored values crossed one or more set thresholds). Based on this analysis, a probability may be calculated for each modem 302, 304, 306, 308, 310 indicative of the likelihood that the fault is located on the channel leg line that connects the respective modem 302, 304, 306, 308, 310 to a node. As shown, the fault notification graphic 300 includes a polygon 312 having a point for each modem 302, 304, 306, 308, 310, wherein the placement of the point for each modem 302, 304, 306, 308, 310 is indicative of the likelihood that the fault is located on the channel leg line that connects the respective modem 302, 304, 306, 308, 310 to a node. Specifically, a point being close to the center of the fault notification graphic 300, as shown for modem 302 in FIG. 3, indicates a low likelihood that fault is located on the channel leg line that connects the modem 302 to a node. Correspondingly, a point near the outer edge of the fault notification graphic 300, as shown for modem 304 in FIG. 3, indicates a high likelihood that fault is located on the channel leg line that connects the modem 304 to a node. Though the fault notification graphic 300 of FIG. 3 is for a system having 5 modems, it should be understood that similar fault notification graphics 300 are envisaged form systems having different numbers of modems (e.g., 2, 3, 4, 5, 6, 7, 8, 9, 10, 15, 20, 25, 30, 40, 50, 60, 75, 100, or any other number of modems). Further, other graphics that communicate a probability that a fault is disposed at a plurality of locations are also envisaged FIG. 4 is a flow chart of a process 400 for training a model (e.g., machine learning model) to identify and locate faults or developing faults in data. At block 402, historical data associated with faults is collected or retrieved and provided to the model. The historical data may include, for example, locations of the past faults, and data received before and after the past faults occurred. The data may include, for example, measured data for line insulation impedance, insulation resistance, signal amplitude, signal power, signal attenuation, signal frequency spectra, signal to noise ratio, signal modulation, error rates and so forth collected from multiple locations within a subsea hydrocarbon extraction system. At block 404, the data may be analyzed to identify trends that occur when a fault is developing and/or has developed. Accordingly, the process 400 may be able to identify patterns of healthy communication within the subsea hydrocarbon extraction system and build a mathematical system model of the physical system and identify sources of disturbance. At block 406, the process sets threshold values and/or expected operational ranges of values for identifying and/or predicting faults. As data is collected and analyzed, the data may be compared to the set threshold values and/or expected operational ranges of values to identify when a fault is developing or has developed and to locate the fault. Further, as data is collected, new data may be added to the historical data set, increasing the size of the data used to train the model. As such, the model may be retrained based on new data on an iterative or rolling basis. Further, the process may be configured to analyze collected data to identify drift and update the set threshold values and/or expected operational ranges of values accordingly to account for the drift.

Figure 5:
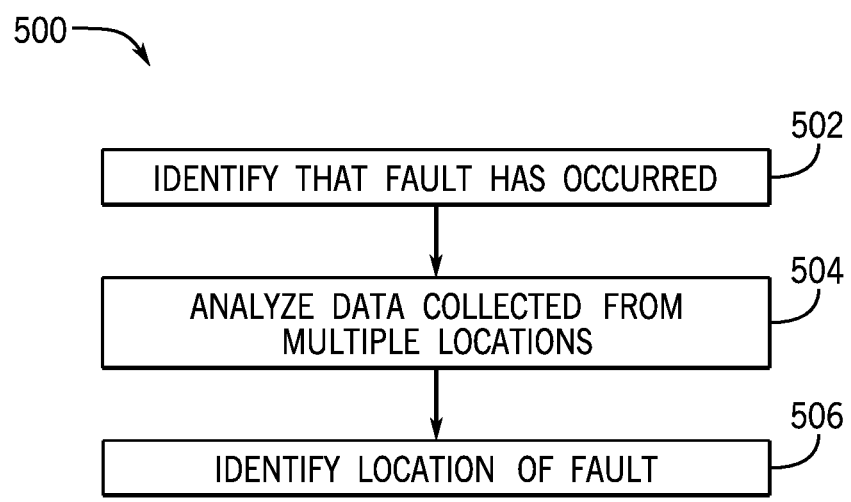
FIG. 5 is a flow chart of a process for identifying and locating faults or developing faults within the subsea hydrocarbon extraction system shown in FIG. 1, in accordance with an embodiment of the present disclosure.

FIG. 5 is a flow chart of a process 500 for identifying and locating a fault that has already occurred. At block 502, the process identifies that a fault has occurred. This may include, for example, a monitored value crossing a threshold or being outside of expected operational ranges. The measured value may include, for example, line insulation impedance, insulation resistance, signal amplitude, signal power, signal attenuation, signal frequency spectra, signal to noise ratio, signal modulation, error rates and so forth collected from multiple locations within a subsea hydrocarbon extraction system. In other embodiments, the fault may be recognized at the topside control unit. At block 504, the process analyzes data collected from multiple locations. The analysis may include, for example, comparing data received by the topside control unit from all of the SCMs, or a subset of SCMs, within the subsea hydrocarbon extraction system before the fault occurs (e.g., data collected at a time when the collected data was known to be within a specified acceptance criteria) to data received by the topside control unit from all of the SCMs, or the subset of the SCMs, within the subsea hydrocarbon extraction system after the fault occurs. Based on the analysis, the process 500 may be able to determine that data received from a particular SCM, or particular group of SCMs, was affected by the fault, but data received from the other SCMs was not affected by the fault. Accordingly, at block 506, the process 500 can locate the fault as likely occurring somewhere on the channel leg line between the node upstream of the particular SCM, or particular group of SCMs, and the particular SCM, or particular group of SCMs. In some embodiments, a notification may be generated identifying the fault and/or a location of the fault.

Figure 6:
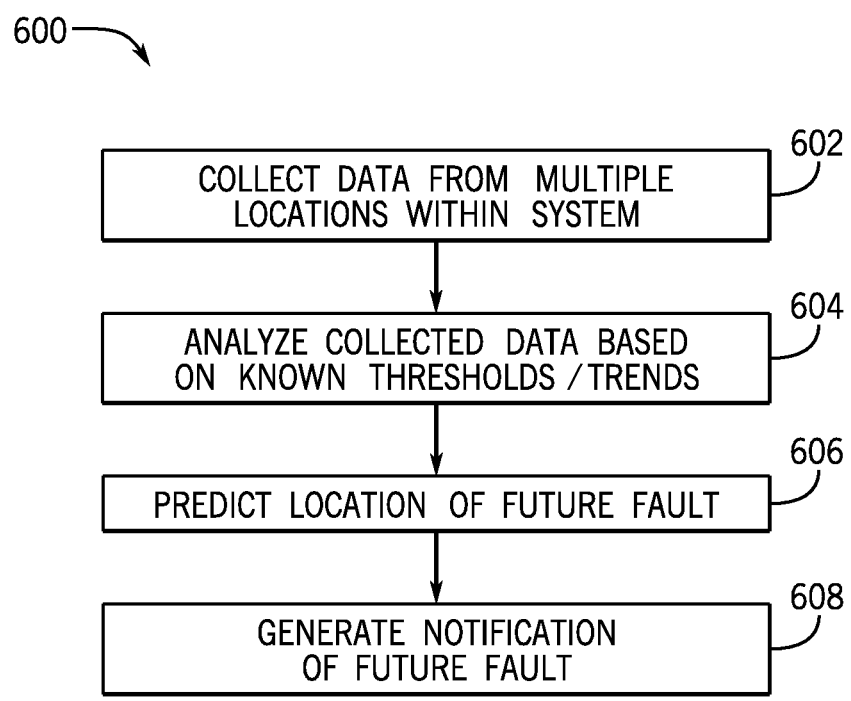
FIG. 6 is a flow chart of a process for predicting a location of a future fault within the subsea hydrocarbon extraction system shown in FIG. 1, in accordance with an embodiment of the present disclosure.

FIG. 6 is a flow chart of a process 600 for predicting a location of a future fault or a developing fault. At block 602, data is collected from multiple locations within a subsea hydrocarbon extraction system. Data may be collected, for example, from all of the SCMs or subsea modems within a system, or a subset of SCMs or subsea modems within the system. In some embodiments, data may be collected from other places within the system, such as communication nodes, other locations on the main channel line, intermediate channel lines, or channel leg lines, other subsea locations, the MCS, EPU, or other topside locations. The data may include measurements for line insulation impedance, insulation resistance, signal amplitude, signal power, signal attenuation, signal frequency spectra, signal to noise ratio, signal modulation, error rates and so forth. At block 604, the collected data is analyzed using a model and/or based on comparing the collected data to the set threshold values and/or expected operational ranges of values to identify a developing fault or future fault. For example, the process 600 may detect a trend in the collected data that has previously been seen before a fault develops or as a fault is developing. Further, in some embodiments, collected data crossing set threshold values and/or being outside of expected operational ranges of values may be indicative of a developing fault or conditions likely to develop into a fault in the future. At block 606, the location of the developing fault or future fault is predicted. For example, the process 600 may compare collected data from all of the SCMs, or a subset of SCMs, within the subsea hydrocarbon extraction system before the monitored data crossed the set threshold values and/or exited the expected operational ranges of values to data collected from all of the SCMs, or the subset of the SCMs, within the subsea hydrocarbon extraction system after the monitored data crossed the set threshold values and/or exited the expected operational ranges of values. The process 600 may be able to determine that data received from a particular SCM, or particular group of SCMs, showed signs of a developing fault, or conditions that could lead to a fault in the future, but data received from the other SCMs did not show any signs of a fault. Accordingly, at block 606, the process 600 can predict the location of the developing fault or future fault as likely occurring somewhere on channel leg line between the node upstream of the particular SCM, or particular group of SCMs, and the particular SCM, or particular group of SCMs. At block 608, a notification may be generated predicting the developing or future fault and its location.

Figure 7:
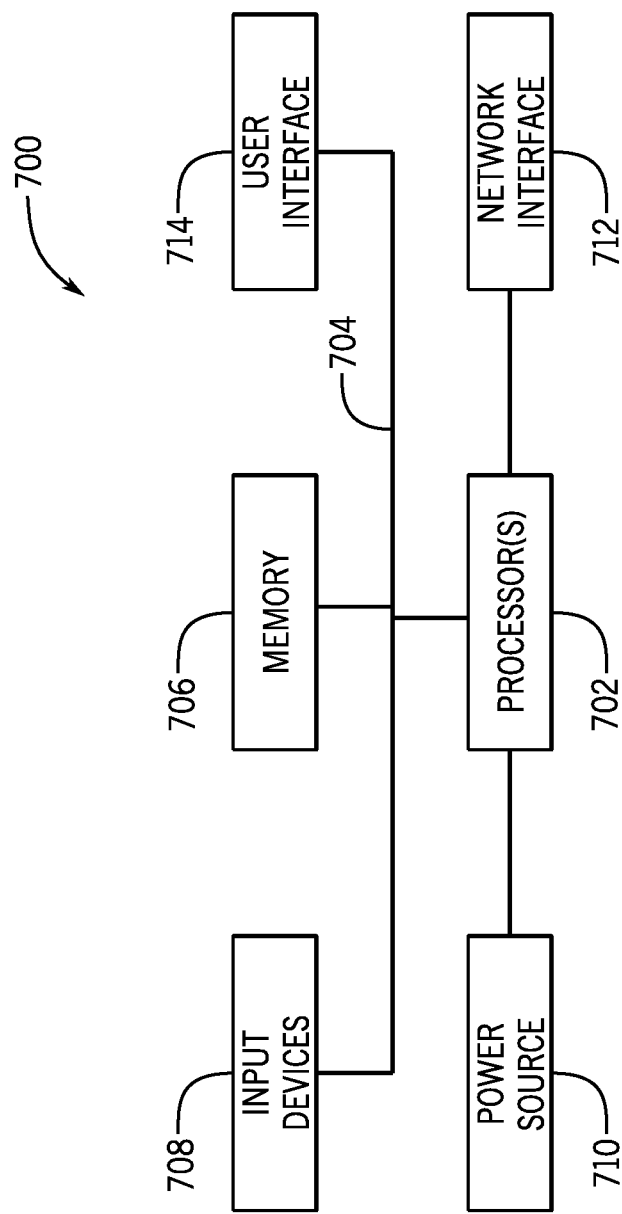
FIG. 7 is a schematic of a computing system that may be used within the subsea hydrocarbon extraction system shown in FIG. 1, in accordance with an embodiment of the present disclosure.

It may be appreciated that the present approach may be implemented using one or more processor-based systems such as shown in FIG. 7. For example, such processor-based systems may be utilized in the SCMs 110, 112, 114, 116, the subsea modems 118, 120, 122, 124, the topside control unit 126, the MCS 128, the EPU 130, the topside modem 132, the cloud 146, and the remote server 148 shown in FIG. 1, as well as other components within the subsea hydrocarbon extraction system. Likewise, applications and/or databases utilized in the present approach may be stored, employed, and/or maintained on such processor-based systems. As may be appreciated, such systems as shown in FIG. 7 may be present in a distributed computing environment, a networked environment, or other multi-computer architecture.

With this in mind, an example computer system may include some or all of the computer components depicted in FIG. 7. FIG. 7 generally illustrates a block diagram of example components of a computing system 700 and their potential interconnections or communication paths, such as along one or more busses. As illustrated, the computing system 700 may include various hardware components such as, but not limited to, one or more processors 702, one or more busses 704, memory 706, input devices 708, a power source 710, a network interface 712, a user interface 714, and/or other computer components useful in performing the functions described herein.

The one or more processors 702 may include one or more microprocessors capable of performing instructions stored in the memory 706. Additionally or alternatively, the one or more processors 702 may include application-specific integrated circuits (ASICs), field-programmable gate arrays (FPGAs), and/or other devices designed to perform some or all of the functions discussed herein without calling instructions from the memory 706.

With respect to other components, the one or more busses 704 include suitable electrical channels to provide data and/or power between the various components of the computing system 700. The memory 706 may include any tangible, non-transitory, and computer-readable storage media. Although shown as a single block in FIG. 7, the memory 706 can be implemented using multiple physical units of the same or different types in one or more physical locations. The input devices 708 correspond to structures to input data and/or commands to the one or more processors 702. For example, the input devices 708 may include a mouse, touchpad, touchscreen, keyboard and the like. The power source 710 can be any suitable source for power of the various components of the computing system 700, such as line power and/or a battery source. The network interface 712 includes one or more transceivers capable of communicating with other devices over one or more networks (e.g., a communication channel). The network interface 712 may provide a wired network interface or a wireless network interface. A user interface 714 may include a display that is configured to display text or images transferred to it from the one or more processors 702. In addition and/or alternative to the display, the user interface 714 may include other devices for interfacing with a user, such as lights (e.g., LEDs), speakers, and the like.

The present disclosure includes techniques for identifying and locating existing faults or developing faults within a subsea hydrocarbon extraction system. Specifically, modems distributed throughout a subsea hydrocarbon extraction system may be used to collect and/or transmit data associated with the communication lines within subsea hydrocarbon extraction system. Such data may include, for example line insulation impedance, insulation resistance, signal amplitude, signal power, signal attenuation, signal frequency spectra, signal to noise ratio, signal modulation, error rates and so forth. In some embodiments, data may be compared to the set threshold values and/or expected operational ranges of values to identify when a fault is developing or has developed and to locate the fault. Data from all of the SCMs, or a subset of SCMs, within the subsea hydrocarbon extraction system before the monitored data crossed the set threshold values and/or exited the expected operational ranges of values may be compared to data collected from all of the SCMs, or the subset of the SCMs, within the subsea hydrocarbon extraction system after the monitored data crossed the set threshold values and/or exited the expected operational ranges of values to locate a fault or developing fault. Based on this comparison, if data received from a particular SCM, or a particular subset of SCMs was affected by the fault, but data received from other SCMs was not affected by the fault, then the fault as likely occurring somewhere on the channel leg line between upstream node and particular SCM, or a particular subset of SCMs. Similar techniques maybe used to analyze historical data from previous faults and set threshold and or expected operational ranges for monitored values. Based on monitored values crossing set threshold values, exiting expected operational ranges, or otherwise exhibiting previously observed trends, developing faults can be identified and/or predicted and caught early. Accordingly, the disclosed techniques allow for developing communication line faults in subsea hydrocarbon extraction system to be identified and located early such that resources spent locating and repairing faults are reduced, and the amount of time the subsea hydrocarbon extraction system spend offline as a result of faults is reduced or eliminated.

The above discussion is meant to be illustrative of the principles and various embodiments of the present disclosure. While certain embodiments have been shown and described, modifications thereof can be made by one skilled in the art without departing from the spirit and teachings of the disclosure. The embodiments described herein are exemplary only and are not limiting. Accordingly, the scope of protection is not limited by the description set out above, but is only limited by the claims that follow, that scope including all equivalents of the subject matter of the claims.

What is claimed is:

1. A subsea hydrocarbon extraction system comprising:
   surface instrumentation;
   a main channel line coupled to the surface instrumentation;
   a first location comprising:
     a first subsea control module including one or more sensors configured to collect first data and configured to control operation of a first subsea asset at the first location, wherein the first subsea asset comprises a first well or a first wellhead; and
     a first subsea modem communicatively coupled to the first subsea control module and configured to transmit the first data to the surface instrumentation via a first channel leg line coupled to the main channel line via a first node;
   a second location comprising:
     a second subsea control module including one or more sensors configured to collect second data and configured to control operation of a second subsea asset at the second location, wherein the second subsea asset comprises a second well or a second wellhead; and
     a second subsea modem communicatively coupled to the second subsea control module and configured to transmit the second data to the surface instrumentation via a second channel leg line coupled to the main channel line via the first node;
   a third location comprising:
     a third subsea control module including one or more sensors configured to collect third data and configured to control operation of a third subsea asset at the third location, wherein the third subsea asset comprises a third well or a third wellhead; and
     a third subsea modem communicatively coupled to the third subsea control module and configured to transmit the third data to the surface instrumentation via a third channel leg line coupled to the first channel leg line at a second node disposed along the first channel leg line between the first node and the first subsea modem; and
   wherein the surface instrumentation includes a master control station configured to perform operations comprising:
     receiving the first data and the second data via a main channel line communicatively coupled to the first channel leg line and the second channel leg line;
     identifying a fault or a developing fault in the first channel leg line based on an analysis of the first data and the second data, wherein identifying the fault or the developing fault comprises:
       identifying a first moment in time at which the first and second data does not exceed a threshold value or is within a range of expected operational values;
       identifying a second moment in time at which the first data exceeds the threshold value or is outside of the range of expected operational values;
       comparing the first data to the second data at the first moment in time and the second moment in time; and
       determining, based on the comparison of the first data to the second data at the first moment in time and the second moment in time, that the fault is located in the first channel leg line; and
     generating and transmitting a notification indicating that the fault or the developing fault is in the first channel leg line.

2. The subsea hydrocarbon extraction system of claim 1, wherein the operations further comprise:
   receiving first historical data associated with one or more past faults; and
   training a machine learning model using the first historical data, wherein training the machine learning model comprises analyzing the first historical data to recognize one or more trends in the first historical data as the one or more past faults developed.

3. The subsea hydrocarbon extraction system of claim 2, wherein the operations further comprise determining, via the machine learning model, the threshold value or the range of expected operational values, wherein the threshold value or the range of expected operational values are configured to be used by the master control station to identify new faults in the subsea hydrocarbon extraction system.

4. The subsea hydrocarbon extraction system of claim 3, wherein the operations further comprise:
receiving second historical data associated with one or more new faults;
retraining the machine learning model using the second historical data; and
adjusting the threshold value or the range of expected operational values based on the retrained machine learning model.

5. The subsea hydrocarbon extraction system of claim 4, wherein retraining the machine learning model using the second historical data comprises identifying drift in the second historical data.

6. The subsea hydrocarbon extraction system of claim 1, wherein identifying the fault or the developing fault in the first channel leg line further comprises recognizing a trend in the first data indicative of the developing fault in the first channel leg line, wherein the trend was recognized in a historical data set associated with one or more past faults.

7. The subsea hydrocarbon extraction system of claim 1, wherein the first and second data comprise values for a line insulation impedance, an insulation resistance, a signal amplitude, a signal power, a signal attenuation, a signal frequency spectra, a signal to noise ratio, a signal modulation, an error rate, or any combination thereof.

8. A subsea hydrocarbon extraction system comprising:
a master control station comprising a processor and a memory, the memory storing instructions that, when executed by the processor, cause the processor to perform operations comprising:
receiving, via a main channel line and from a first subsea modem at a first location, first data associated with a first subsea control module at the first location, wherein:
the first data is collected by one or more sensors of the first subsea control module at the first location;
the first subsea control module is communicatively coupled to a first subsea asset at the first location;
the first subsea asset comprises a first well or a first wellhead; and
the main channel line is communicatively coupled to the first subsea modem via a first channel leg line at a first node;
receiving, via the main channel line and from a second subsea modem at a second location, second data associated with a second subsea control module at the second location, wherein:
the second data is collected by one or more sensors of the second subsea control module at the second location;
the second subsea control module is communicatively coupled to a second subsea asset at the second location;
the second subsea asset comprises a second well or a second wellhead; and
the main channel line is communicatively coupled to the second subsea modem via a second channel leg line at the first node;
receiving, via the main channel line and from a third subsea modem at a third location, third data associated with a third subsea control module at the third location, wherein:
the third data is collected by one or more sensors of the third subsea control module at the third location;
the third subsea control module is communicatively coupled to a third subsea asset at the third location;
the third subsea asset comprises a third well or a third wellhead; and
the third subsea modem is communicatively coupled to a second node disposed along the first channel leg line between the first node and the first subsea modem;
identifying a fault or a developing fault in the first channel leg line based on an analysis of the first data, the second data and the third data, wherein identifying the fault or the developing fault in the first channel leg line comprises:
identifying a first moment in time at which the first and second data does not exceed a threshold value or is within a range of expected operational values;
identifying a second moment in time at which the first data exceeds the threshold value or is outside of the range of expected operational values;
comparing the first data to the second data at the first moment in time and the second moment in time; and
determining, based on the comparison of the first data to the second data at the first moment in time and the second moment in time, that the fault is located in the first channel leg line; and
generating and transmitting a notification indicating that the fault or the developing fault is in the first channel leg line.

9. The subsea hydrocarbon extraction system of claim 8, wherein the operations further comprise:
receiving first historical data associated with one or more past faults;
training a machine learning model using the first historical data, wherein training the machine learning model comprises analyzing the first historical data to recognize one or more trends in the first historical data as the one or more past faults developed; and
determining, via the machine learning model, the threshold value or the range of expected operational values, wherein the one or more threshold values or the one or more ranges of expected operational values are configured to be used by the master control station to identify new faults in the subsea hydrocarbon extraction system.

10. The subsea hydrocarbon extraction system of claim 8, wherein identifying the fault or the developing fault in the first channel leg line further comprises recognizing a trend in the first data indicative of the developing fault in the first channel leg line, wherein the trend was recognized in a historical data set associated with one or more past faults.

11. The subsea hydrocarbon extraction system of claim 8, wherein the first and second data comprise values for a line insulation impedance, an insulation resistance, a signal amplitude, a signal power, a signal attenuation, a signal frequency spectra, a signal to noise ratio, a signal modulation, an error rate, or any combination thereof.

12. A method comprising:
receiving, via a main channel line and from a first subsea modem at a first location, first data associated with a first subsea control module at the first location, wherein:
the first data is collected by one or more sensors of the first subsea control module at the first location;

the first subsea control module is communicatively coupled to a first subsea asset at the first location;

the first subsea asset comprises a first well or a first wellhead; and the main channel line is communicatively coupled to the first subsea modem via a first channel leg line at a first node;

receiving, via the main channel line and from a second subsea modem at a second location, second data associated with a second subsea control module at the second location, wherein:

the second data is collected by one or more sensors of the second subsea control module at the second location;

the second subsea control module is communicatively coupled to a second subsea asset at the second location;

the second subsea asset comprises a second well or a second wellhead; and the main channel line is communicatively coupled to the second subsea modem via a second channel leg line at the first node;

receiving, via the main channel line and from a third subsea modem at a third location, third data associated with a third subsea control module at the third location, wherein:

the third data is collected by one or more sensors of the third subsea control module at the third location;

the third subsea control module is communicatively coupled to a third subsea asset at the third location;

the third subsea asset comprises a third well or a third wellhead; and the third subsea modem is communicatively coupled to a second node disposed along the first channel leg line between the first node and the first subsea modem;

identifying a fault or a developing fault in the first channel leg line based on an analysis of the first data, the second data and the third data, wherein identifying the fault or the developing fault in the first channel leg line comprises:

identifying a first moment in time at which the first and second data does not exceed a threshold value or is within a range of expected operational values;

identifying a second moment in time at which the first data exceeds the threshold value or is outside of the range of expected operational values;

comparing the first data to the second data at the first moment in time and the second moment in time; and determining, based on the comparison of the first data to the second data at the first moment in time and the second moment in time, that the fault is located in the first channel leg line; and generating and transmitting a notification indicating that the fault or the developing fault is in the first channel leg line.

13. The method of claim 12, wherein identifying the fault or the developing fault in the first channel leg line further comprises recognizing a trend in the first data indicative of the developing fault in the first channel leg line, wherein the trend was recognized in a historical data set associated with one or more past faults.

14. The method of claim 12, wherein the first and second data comprise values for a line insulation impedance, an insulation resistance, a signal amplitude, a signal power, a signal attenuation, a signal frequency spectra, a signal to noise ratio, a signal modulation, an error rate, or any combination thereof.

* * * * *